United States Patent [19]
Uchio et al.

[11] Patent Number: 5,701,187
[45] Date of Patent: Dec. 23, 1997

[54] PORTABLE INPUT APPARATUS

[75] Inventors: Masatoshi Uchio; Yuichi Yasuda, both of Fukushima-ken, Japan

[73] Assignee: Alps Electric Co., Ltd., Tokyo, Japan

[21] Appl. No.: 571,484

[22] Filed: Dec. 13, 1995

[30] Foreign Application Priority Data

Dec. 13, 1994 [JP] Japan ................................. 6-309196

[51] Int. Cl.$^6$ ............................................ H04B 10/00
[52] U.S. Cl. .................. 359/143; 359/152; 359/157; 348/734
[58] Field of Search .......................... 359/143, 144, 359/146, 152, 157, 159, 163, 189; 348/734; 345/81

[56] References Cited

U.S. PATENT DOCUMENTS 5,045,843  9/1991  Hansen ........................ 340/709
5,561,543  10/1996  Ogawa ......................... 359/143

FOREIGN PATENT DOCUMENTS 0117534  5/1989  Japan ........................... 359/157

*Primary Examiner*—Kinfe-Michael Negash
*Attorney, Agent, or Firm*—Guy W. Shoup; Patrick T. Bever

[57] ABSTRACT

A portable input apparatus used in conjunction with a controllable information processing apparatus which comprises a light receiving element receiving a base light emitted from a light emitting section of the controllable information processing apparatus and being composed of a first detector light receiving element, a second detector light receiving element and a reference light receiving element arranged therebetween, each being of a non-split type; an optical signal transmitting section transmitting an optical signal to the controllable information processing apparatus side; signal conversion sections converting an output current of the non-split type light receiving element and generating a time shared output voltage; a signal processing section processing the time shared output voltage to generate relative angle data; and a control section performing operation and calculation of the relative angle data to form a coordinate signal and transmitting the optical signal including the coordinate signal to the controllable information processing apparatus side.

9 Claims, 4 Drawing Sheets

PORTABLE INPUT APPARATUS

BACKGROUND OF THE INVENTION

1. Field of the Invention

The present invention relates to a portable input apparatus which is used in conjunction with a controllable information processing apparatus, more particularly, to a portable input apparatus such that a base light emitted from a light emitting section of the controllable information processing apparatus is received by non-split type three light receiving elements.

2. Description of the Related Art

A relative angle detection apparatus has already been proposed by the assignee of this application. In the relative angle detection apparatus, a light emitting section is arranged on a controllable information processing apparatus side such as a computer and a game apparatus, and split light receiving sections are arranged on a portable input apparatus side. The light emitted from the light emitting section of the controllable information processing apparatus side is received by the split light receiving elements of the portable input apparatus side. A relative angle between the light emitting section and the split light receiving elements, i.e. a relative angle between the controllable information processing apparatus and the portable input apparatus is detected according to an electric signal obtained by the split light receiving elements, and the detection results are displayed on a display section of the controllable information processing apparatus (hereinafter, the relative angle detection apparatus is referred to as the proposed relative angle detection apparatus).

FIG. 4 is a block diagram showing an example of the proposed relative angle detection apparatus (portable input apparatus) in which the controllable information processing apparatus is a computer.

As shown in FIG. 4, a computer (controllable information processing apparatus) 31 comprises a CRT (cathode ray tube) 33 for displaying images, a light emitting section 32 to be arranged on a peripheral portion, such as the upper portion of the CRT 33 and an optical signal receiving section 34. A portable input apparatus 35 has a shape of a rectangular parallelepiped, and a detecting section (not shown) is provided on the front thereof. The detecting section consists of split light receiving element 36 including four-part split light receiving sections 36a to 36d each being formed of, for example, a photodiode, a diaphragm (not shown) having a rectangular opening and a visible light cut-off filter (not shown) each being arranged on the front side of the split light receiving element 36. Among the four-part split light receiving sections 36a to 36d, the light receiving sections 36b and 36d are connected to a current-voltage (I-V) converter 37a so that output currents thereof are added, and the light receiving sections 36a and 36c are connected to a current-voltage (I-V) converter 37b so that output currents thereof are added. In addition, the light receiving sections 36a and 36b are connected to a current-voltage (I-V) converter 37c so that output currents thereof are added, and the light receiving sections 36c and 36d are connected to a current-voltage (I-V) converter 37d so that output currents thereof are added. The outputs of the I-V converters 37a to 37d are connected to fixed contact terminals side of a selector switch 38 having one circuit and four contacts, and a movable contact terminal of the selector switch 38 is connected to an input of a signal processing section 40. The selector switch 38 is connected to a switching controller 39 and switching operation of the contacts is performed by the control of the switching controller 39. The signal processing section 40 includes inside thereof a variable gain amplifier, a band-pass filter (BPF) circuit, a peak holding circuit such as a sample-hold (S/H) circuit and an analog-digital (A/D) converter, and outputs thereof are connected to a control section 42. An output of the BPF circuit in the signal processing section 40 is connected to an input of a waveform shaping circuit 41 and an output of the waveform shaping circuit 41 is connected to the control section 42. The control section 42 is connected to the switching controller 39 and the optical signal transmitting section 43. The optical signal transmitting section 43 includes a plurality of light emitting elements which emit lights of an infrared region.

With respect to three directions represented by rectangular three dimensional coordinates, if the lengthwise direction of the portable input apparatus 35 is taken as Z-axis direction and each of two directions orthogonal to the Z-axis are taken as X-axis direction and Y-axis direction, the four-part split light receiving sections 36a to 36d are arranged so that the light receiving sections 36a and 36b, and 36c and 36d are aligned in the X-axis direction and the light receiving sections 36a and 36c, and 36b and 36d are aligned in the Y-axis direction.

The proposed relative angle detection apparatus (portable input apparatus) constructed as described above is operated as follows.

When an operator has the portable input apparatus 35 in hand and points the detecting section side thereof toward a CRT 33 (a light emitting section 32), a base light of the infrared region having a frequency f emitted from the light emitting section 32 is incident in the detecting section of the portable input apparatus 35. The incident base light is first subjected to the elimination of a visible light component with a visible light cut-off filter (not shown), and then to the adjustment of an amount of incidence with a diaphragm (not shown) and thereafter, applied to the four-part split light receiving sections 36a to 36d which constitute the split light receiving elements 36. At this time, a rectangular spot light defined by the opening of the diaphragm is applied to the four-part split light receiving sections 36a to 36d, and current outputs $I_{LU}$, $I_{RU}$, $I_{LD}$, and $I_{RD}$ corresponding to application areas of the spot light are output from the four-part split light receiving sections 36a and 36d. Each of these current outputs $I_{LU}$, $I_{RU}$, $I_{LD}$, and $I_{LD}$ include a frequency f which is a main component of the base light. Then, the sum of the current outputs $(I_{RU}+I_{RD})$ obtained by one set of the light receiving sections 36a and 36c arranged in the Y-axis direction is supplied to the I-V converter 37a, and the sum of the current outputs $(I_{LU}+I_{LD})$ obtained by the other set of the light receiving sections 36b and 36d arranged in the Y-axis direction is supplied to the I-V converter 37b, respectively. In addition, the sum of the current outputs $(I_{LU}+I_{RU})$ obtained by one set of the light receiving sections 36a and 36b arranged in the X-axis direction is supplied to the I-V converter 36c, and the sum of the current outputs $(I_{LD}+I_{RD})$ obtained by the other set of the light receiving sections 36c and 36d mounted in the X-axis direction is supplied to the I-V converter 37d, respectively. Each of the I-V converters 37a to 37d convert the input current into the output voltage and allow channels 1 to 4 to generate light receiving output voltages V1 to V4. Then, the light receiving output voltages V1 to V4 are supplied to the selector switch 38. The movable contacts of the selector switch 38 are switched on a predetermined cycle by the switching controller 39 which operates in response to a switching signal supplied from the control section 42 in order of channel 1, channel 2, channel 3, channel 4, channel 1, channel 2 ... .

Thus, the light receiving output voltages V1 to V4 become time shared output voltages selected by the selector switch 38 in a time sharing manner, and the time shared output voltages are supplied to the signal processing section 40. The time shared output voltages supplied to the signal processing section 40 are amplified in the variable gain amplifier by a gain corresponding to a gain control voltage supplied from the control section 42 and then, unnecessary frequency components except for the frequency f are eliminated in the BPF circuit. In addition, a signal having the frequency f output from the BPF circuit is subjected to sampling and held in the S/H circuit and then, the sampling voltage is converted into a digital signal in the A/D converter. The digital signal is supplied to the control section 42 as relative angle data.

In the signal processing section 40, the signal having the frequency f output from the BPF circuit is supplied to the waveform shaping circuit 41. The waveform shaping circuit 41, under the control of the control section 42, generates a trigger pulse and the like when the signal having the frequency f reaches the peak voltage in a stable condition after a channel switching of the selector switch 38 is performed. The control section 42 supplies a timing pulse and the like instructing the start and end of the sampling to the S/H circuit in response to the trigger pulse and the like, and supplies a timing pulse and the like instructing the start and end of the digital conversion to the A/D circuit.

Therefore, the S/H circuit starts sampling of the signal having the frequency f output from the BPF circuit with the timing pulse supplied from the control section 42 and holds the sampling voltage obtained by the sampling. When several periods of the signal output from the BPF circuit having the frequency f elapses after the channels are switched by the selector switch 39, the sampling voltage indicates the stable peak voltage in one period of the signal. The A/D converter converts the sampling voltage held in the S/H circuit into a digital signal with the timing pulse supplied from the control section 42, and the obtained digital signal is supplied to the control section 42 as the relative angle data.

The control section 42 performs operations of the relative angle data which are sequentially supplied in response to a switching of the selector switch 38. The operations are represented by $\{(V1p-V2p)/(V1p+V2p)\}$ and $\{(V3p-V4p)/(V3p+V4p)\}$ where V1p, V2p, V3p and V4p are relative angle data (digital peak voltage) derived from the light receiving output voltages V1, V2, V3 and V4, respectively. A tilt angle θx of the portable input apparatus 35 in the X-axis direction is determined by the former operation and a tilt angle θy of the portable input apparatus 35 in the Y-axis direction is determined by the latter operation. In addition, the control section 42 performs coordinate calculation with the converted distance on the X-Y coordinates of a display surface of the CRT 33 according to the obtained angles θx and θy to generate a coordinate signal, and supplies the coordinate signal to the optical signal transmitting section 43. The optical signal transmitting section 43 transmits the optical signal of the infrared region including the coordinate signal to the light receiving section 34 of the computer 31 side by lighting a plurality of light emitting elements. The optical signal receiving section 34 performs display on the required position of the display surface of the CRT 33 in the form of a cursor mark according to the coordinate signal in the optical signal received therein.

In this case, when the operator suitably moves the detecting section of the portable input apparatus 35 in the direction substantially parallel to the display surface of the CRT 35, or suitably changes the angle of the portable input apparatus 35 with respect to the display surface, the tilt angle θx in the X-axis direction and the tilt angle θy in the Y-axis direction of the portable input apparatus 35 may be changed occasionally, and the position of the cursor mark to be displayed on the display surface of the CRT 33 may be changed occasionally with changes of the tilt angles.

The proposed relative angle detection apparatus can effectively move the position of the cursor mark to be displayed on the CRT 33 of the computer 31 by suitably changing the position of the portable input apparatus 35 with respect to the computer 31. However, the base light from the light emitting section 32 of the computer 31 is received by the split light receiving element 36 which is split into, for example, four light receiving sections 36a to 36d. Thus, the cost of manufacturing the split light receiving element 36 and peripheral devices thereof may be increased for the following reasons: it is relatively difficult to manufacture the split light receiving element 36; the commonly used light receiving element is not split and the split light receiving element 36 has no versatility; and additional mounting substrates are required when the split light receiving element 36 is mounted on the main substrate of the portable input apparatus 35 side. In addition, when the current outputs obtained by the four light receiving sections 36a to 36d are converted into time shared output voltages in the signal conversion section, the magnitude of the current outputs and transient response caused at the time of switching of the output voltages must be taken into consideration in order to adjust output timings of the time shared output voltages.

SUMMARY OF THE INVENTION

It is an object of the present invention to provide a portable input apparatus which reduces the cost of manufacturing the portions in relation to the light receiving element and by which excellent sound-to-noise ratio is obtained without consideration of the current outputs of the light receiving elements.

To achieve the above object, the present invention provides a portable input apparatus used in conjunction with a controllable information processing apparatus which comprises a means including a light receiving element receiving a base light emitted from a light emitting section of the controllable information processing apparatus and being composed of a first detector light receiving element, a second detector light receiving element and a reference light receiving element arranged therebetween, each being of a non-split type; an optical signal transmitting section transmitting an optical signal to the controllable information processing apparatus side; a signal conversion section converting an output current of the light receiving element and generating a time shared output voltage; a signal processing section processing the time shared output voltage to generate relative angle data; and a control section performing operation and calculation of the relative angle data to form a coordinate signal and transmitting the optical signal including the coordinate signal to the controllable information processing apparatus.

In this case, the above signal conversion section includes a first additional means which consists of first and second division circuits each dividing output currents of the first and second detector light receiving elements by an output current of the reference light receiving element; first and second current-voltage converters each converting output currents of the first and second division circuits into voltages; a third current-voltage converter converting an output current of the reference light receiving element into a voltage; and a switching circuit adding output voltages of the first to third current-voltage converters in a time sharing manner, and a second additional means in which a lateral part of a light receiving surface of the first detector light receiving element is shielded and a longitudinal part of a light receiving surface of the second detector light receiving element is shielded, respectively and in which the size of the light receiving surface of the reference light receiving element is smaller than each size of the light receiving surface of the first and second detector light receiving elements.

In addition, the above signal conversion section includes a third additional means which consists of an adder adding each of output currents of the first detector light receiving element, the second detector light receiving element and the reference light receiving element; a subtracter subtracting an output current of the second detector light receiving element from an output current of the first detector light receiving element; and adder-subtracter adding the output current of the first detector light receiving element to the output current of the second detector light receiving element and then, subtracting an output of the reference light receiving element; first to third current-voltage converters each converting the output currents of the adder, subtracter and adder-subtracter into voltages; and a switching circuit adding output voltages of the first to third current-voltage converters in a time sharing manner, and a fourth additional means in which each of lateral parts of light receiving surfaces of said first detector light receiving element and said second detector light receiving element are shielded in the oblique and different directions to each other, and in which a longitudinal part of the light receiving surface of said reference light receiving element is shielded.

In the above-described means, the first detector light receiving element, the second detector light receiving element and the reference light receiving element, each of being a non-split type rather than a split type, are used as the light receiving elements in the portable input apparatus side which receive the base light emitted from the light emitting section of the controllable information apparatus.

Therefore, according to the above-described means, the light receiving elements can be manufactured with relative ease and mounted on the main substrate of the portable input apparatus side without the use of additional mounting substrates, thereby reducing the manufacturing cost compared with a case where the split light receiving elements are used.

In addition, according to the above-described means, since lots of the base light are incident at all times in the reference light receiving element arranged between the first and the second light receiving elements, the output current from the reference light receiving element is maximum. However, if the size of a light receiving surface of the reference light receiving element is made smaller than each size of the light receiving surface of the first and the second detector light receiving elements, signal level becomes relatively high at the time of normalization of each of the output currents of the first and second detector light receiving elements. Thus, excellent signal-to-noise ratio can be obtained, thereby obtaining stable normalized output currents. At the same time, the difference between the normalized output currents of the first and second detector light receiving elements can be reduced. Therefore, accurate time shared output voltages can be obtained without consideration of transient response caused when switching of the time shared output voltages, and a return phenomenon of the cursor mark (a phenomenon in which the cursor mark moves in the opposite direction to the movement of the portable input apparatus) on the periphery of a display screen can be prevented.

DESCRIPTION OF THE PREFERRED EMBODIMENTS

The preferred embodiments of the present invention will now be described with reference to the accompanying drawings.

Figure 1:
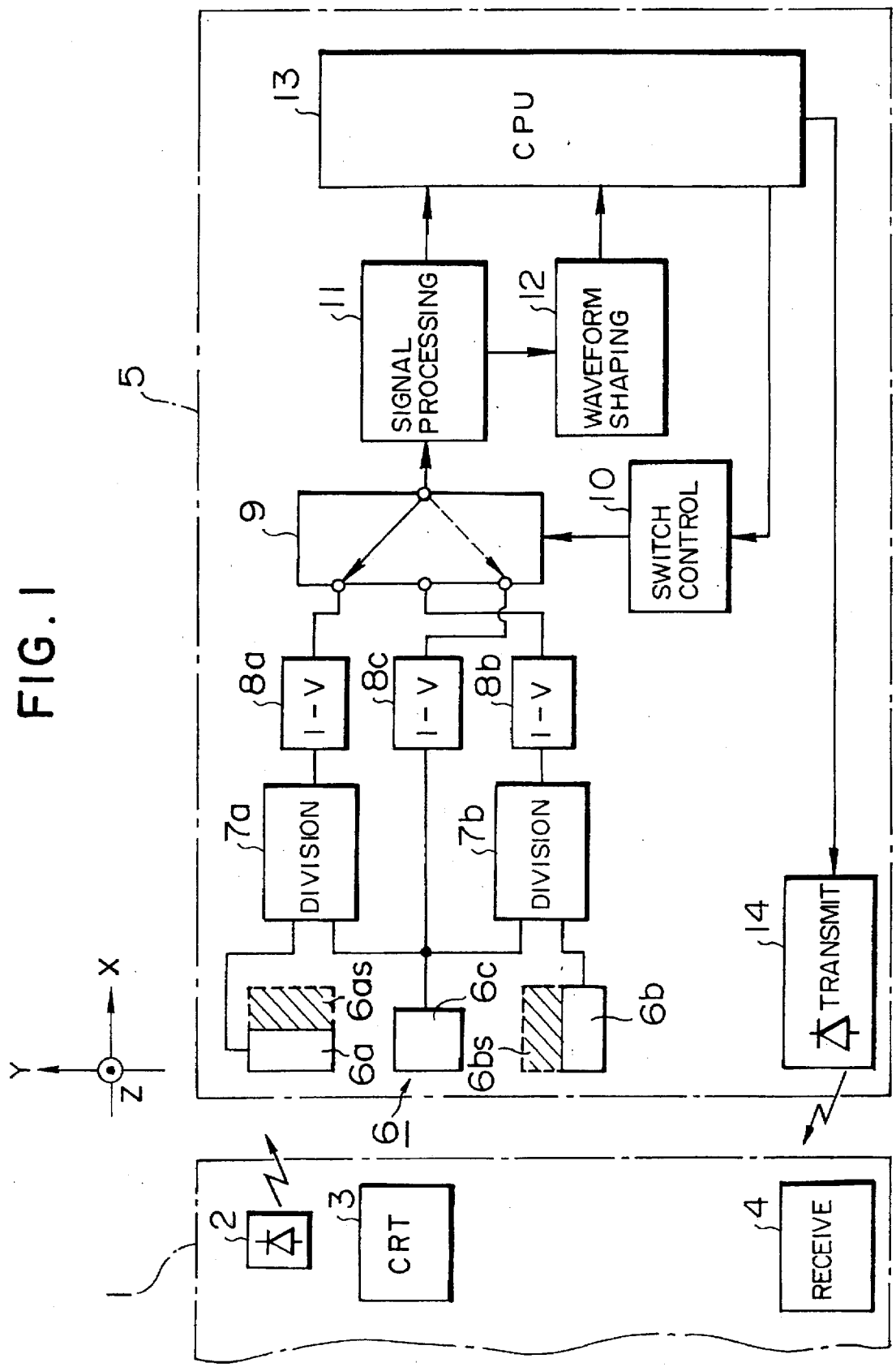
FIG. 1 is a block diagram showing a first embodiment of a portable input apparatus according to the present invention.

FIG. 1 is a block diagram showing a first embodiment of a portable input apparatus according to the present invention which includes a relative angle detection apparatus together with a controllable information processing apparatus comprising a computer.

Here, the difference in structure between the relative angle detection apparatus (portable input apparatus) of the first embodiment and the above proposed relative angle detection apparatus (portable input apparatus) will be described. In the relative angle detection apparatus of the first embodiment, a first detector light receiving element, a second detector light receiving element and a reference light receiving element, each of which is an non-split type light receiving element, are used as the light receiving element of the portable input apparatus side, while a light receiving element comprising four-part split light receiving sections are used in the proposed relative angle detection apparatus. In addition, two division circuits and three current-voltage converters are used in the relative angle detection apparatus of the first embodiment, while four current-voltage converters are used in the proposed relative angle detection apparatus. In order to define configuration of the first embodiment, the overall structure of the relative angle detection apparatus of the first embodiment will be described including the same components as those of the proposed relative angle detection apparatus.

As shown in FIG. 1, a computer (controllable information processing apparatus) 1 comprises a CRT 3 for displaying images, a light emitting section 2 to be arranged on a peripheral portion, such as the upper portion, of the CRT 3 and an optical signal receiving section 4. A portable input apparatus 5 has a shape of a rectangular parallelepiped, and a detecting section (not shown) is provided on the front thereof. The detecting section is formed of a photodiode, and arranged on the front sides of light receiving element 6 composed of a first detector light receiving element 6a, a second detector light receiving element 6b and a reference light receiving element 6c arranged therebetween, each being of a non-split type, and arranged at each front side of the light receiving elements 6a to 6c. The detecting section consists of a diaphragm (not shown) having a rectangular opening and a visible light cut-off filter (not shown). In this case, the size of the light receiving surface of the reference light receiving element 6c is smaller than each size of the light receiving surface of the first and second detector light receiving elements 6a and 6b. A substantially lateral half portion of the first detector light receiving element 6a is shielded by a shielding member 6as and a substantially longitudinal half portion of the second detector light receiving element 6b is shielded by a shielding member 6bs. Outputs of the first detector light receiving element 6a and the reference light receiving element 6c are connected to a first division circuit 7a, and outputs of the second detector light receiving element 6b and the reference light receiving element 6c are connected to a second division circuit 7b. The output of the first division circuit 7a is connected to a first current-voltage (I-V) converter 8a, the output of the second division circuit 7b is connected to a second current-voltage (I-V) converter 8b and the output of the reference light receiving element 6c is connected to a third current-voltage (I-V) converter 8c. The outputs of the first to third I-V converters 8a to 8c is connected to a fixed contact terminals side of a selector switch (switching circuit) 9 having one circuit and three contacts and a movable contact terminal of the selector switch 9 is connected to an input of the signal processing section 11. The selector switch 9 is connected to a switching controller 10 and a switching operation of the contacts is performed by the control of the switching controller 10. The portion including the first and second division circuits 7a and 7b, the first to third I-V converters 8a to 8c and the selector switch 9 forms a signal conversion section. The signal processing section 11 includes inside thereof a variable gain amplifier, a band-pass filter (BPF) circuit, and a peak holding circuit such as a sample-hold (S/H) circuit and an analog-digital (A/D) converter, and outputs thereof are connected to a control section (CPU) 13. An output of the BPF circuit in the signal processing section 11 is connected to an input of a waveform shaping circuit 12, and an output of the waveform shaping circuit 12 is connected to the control section 13. The control section 13 is connected to the switching controller 10 and a optical signal transmitting section 14. The optical signal transmitting section 14 includes a plurality of light emitting elements such as light emitting diodes (LEDs) which emit lights of an infrared region.

With respect to three directions represented by rectangular three dimensional coordinates, if the lengthwise direction of the portable input apparatus 5 is taken as Z-axis direction and each of two directions orthogonal to the Z-axis are taken as X-axis direction and Y-axis direction, respectively, the shielding member 6as of the first detector light receiving element 6a is provided so as to shield a portion of the light receiving surface in the longitudinal, i.e. X-axis direction, and the shielding member 6bs is provided so as to shield a portion of the light receiving surface in the lateral, i.e. Y-axis direction.

The relative angle detection apparatus (portable input apparatus) of the first embodiment constructed as described above is operated as follows.

The relative angle detection apparatus (portable input apparatus) of the first embodiment differs from the proposed relative angle detection apparatus only in the operation mode when the current output obtained from the receipt of the base light by the light receiving elements (split light receiving elements) 6 is processed by the signal processing section to obtain a time shared output voltage. However, in order to define the operation of the relative angle detection apparatus (portable input apparatus) in the first embodiment, the overall operation thereof will be described including overlapping sections in the operation of the proposed relative angle detection apparatus (portable input apparatus).

When an operator has the portable input apparatus 5 in hand and points the detecting section side thereof toward a CRT 3 (a light emitting section 2) of the computer 1, the base light of the infrared region having a frequency of f emitted from a light source of the light emitting section 2 is incident in the detecting section of the portable input apparatus 5. The incident base light is subjected to the elimination of a visible light component with the visible light cut-off filter (not shown) and then, subjected to the adjustment of an amount of incidence with a diaphragm (not shown) and thereafter, the incident base light is applied to the first detector receiving element 6a, the second detector receiving element 6b and the reference light receiving element 6c, respectively. At this time, a rectangular spot light defined by the opening of the diaphragm is applied to each of the light receiving elements 6a to 6c, and current outputs Ia, Ib and Ic corresponding to application areas of the spot light are output from each of the light receiving elements 6a to 6c. Each of the current outputs Ia, Ib and Ic include frequency f which is a major component of the base light. Then, the first division circuit 7a receives and calculates the current outputs Ia and Ic to output a first current division output Ia/Ic, and the second division circuit 7b receives and calculates the current outputs Ib and Ic to output a second current division output Ib/Ic. Consecutively, the first current division output Ia/Ic is supplied to the first I-V converter 8a, the second current division output Ib/Ic is supplied to the second I-V converter 8b and the current output of the reference light receiving element 6c is supplied to the third I-V converter 8c, respectively. Each of the first to third I-V converters 8a to 8c convert the input current into the output voltages and allow the outputs of the first to third I-V converters 8a to 8c to generate light receiving output voltages V1 to V3 of 1 to 3 channels, respectively.

These light receiving output voltages V1 to V3 are supplied to the selector switch 9. The movable contacts of the selector switch 9 are switched on a predetermined cycle by the switching controller 10 which operates in response to a channel switching signal supplied from the control section 13 in order of channel 1, channel 2, channel 3, channel 1, channel 2...(first switching mode) or switched in order of channel 1, channel 2, channel 1, channel 2...(second switching mode). The light receiving output voltage V3 of the channel 3 showing the current output of the reference light receiving element 6c becomes necessary for some controls performed in the control section 13 with the amount of incidence of the base light. Thus, the selector switch 9 operates in the first switching mode. On the other hand, when the light receiving output voltage V3 is not necessary for any controls in the control section 13 with the amount of incidence of the base light, the selector switch 9 operates in the second switching mode. The light receiving output voltages V1 to V3, or V1 to V2 are selected in a time sharing manner to become time shared output voltages, and the time shared output voltages are supplied to the signal processing section 11. The time shared output voltages supplied to the signal processing section 11 are amplified in the variable gain amplifier by a gain corresponding to a gain control signal supplied from the control section 13 and then, unnecessary frequency components except for the frequency f are eliminated in the BPF circuit. In addition, a signal having the frequency f output from the BPF circuit is subjected to sampling and held in the S/H circuit and then, the sampling voltage is converted into the digital signal. The digital signal is supplied to the waveform shaping circuit 12 as relative angle data.

The control section 13 performs operations of the relative angle data which are sequentially supplied in response to a switching of the selector switch 9. The operations are represented by {V1p/(V1p+V2p)} and {V2p/(V1p+V2p)} in which V1p and V2p are relative angle data (digital peak voltage) derived from the light receiving output voltages V1 and V2, respectively. A tilt angle θx of the portable input apparatus 5 in the X-axis direction is determined by the former operation and a tilt angle θy of the portable input apparatus 5 in the Y-axis direction is determined by the latter operation. In addition, the control section 13 performs coordinate calculation with the converted distance on the X-Y coordinates of a display surface of the CRT 3 according to the obtained angles θx and θy to generate a coordinate signal, and supplies the coordinate signal to the optical signal transmitting section 14. The optical signal transmitting section 14 transmits the optical signal including coordinate signal to the light receiving section 3 of the computer 1 side. The computer 1 performs display on the required position of the display surface of the CRT 3 in the form of a cursor mark according to the coordinate signal in the optical signal received by the optical signal receiving section 4.

In this case, when the operator suitably moves the detecting section of the portable input apparatus 5 in the direction substantially parallel to the display surface of the CRT 3, or suitably changes the angle of the portable input apparatus 5 with respect to the display surface, the tilt angle θx of the portable input apparatus 5 in the X-axis direction and the tilt angle θy in the Y-axis direction may be changed occasionally, and the position of the cursor mark displayed on the display surface of the CRT 3 may be changed occasionally with changes of the tilt angles.

Figure 2:
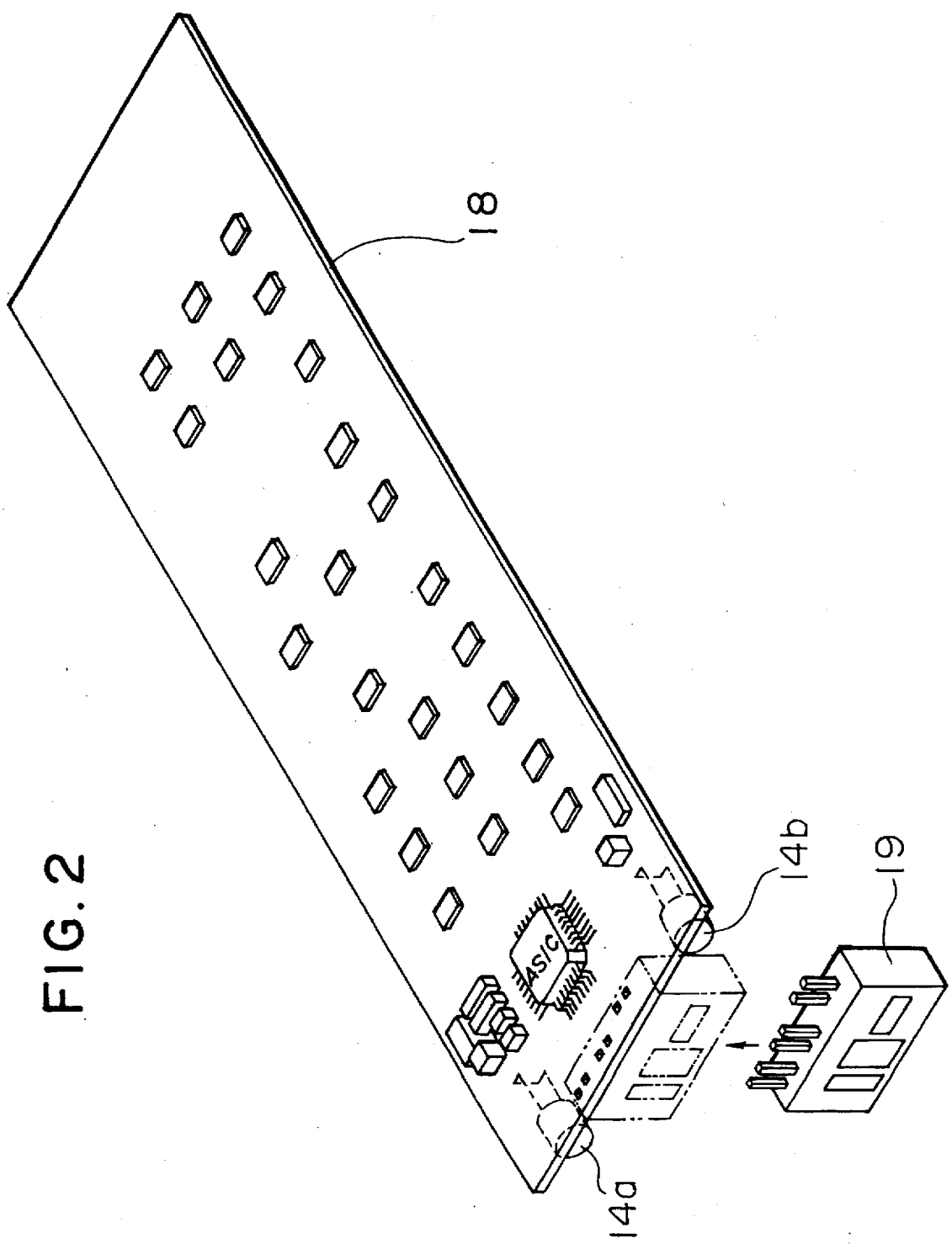
FIG. 2 is a perspective view showing an example of a structure in which non-split type light receiving elements are mounted on a main substrate used in the portable input apparatus shown in FIG. 1.

FIG. 2 is a perspective view showing an example of a structure in which non-split type light receiving elements are mounted on a main substrate used in the portable input apparatus according to the first embodiment.

As shown in FIG. 2, the main substrate 18 has a shape of a rectangle and various elements (no figure number is assigned) all of which are integrated circuits are mounted on the whole surface thereof. To both ends of one width side of the main substrate 18, two LEDs 14a and 14b are attached outwardly, and to the center of the same, a sensor 19 which holds the first detector light receiving element 6a, the second detector light receiving element 6b and the reference light receiving element 6c is attached outwardly.

According to the first embodiment as described above, the first detector light receiving element 6a, the second detector light receiving element 6b and the reference light receiving element 6c, each being of a non-split type, are used as the light receiving element 6 of the portable input apparatus 5 side. This ensures an easy production of the light receiving element 6 as compared with the split type light receiving element and enables the commonly mass-produced light receiving element to be used. Further, it is not necessary to use additional mounting substrates when the light receiving element 6 is mounted on the main substrate 18 of the portable input apparatus side. Thus, the cost of manufacturing the light receiving element 6 and peripheral devices thereof can be reduced.

In addition, according to the first embodiment, a large amount the base light is incident at all times in the reference light receiving element 6c arranged between the first and the second light receiving elements 6a and 6b, and the current output Ic from the reference light receiving element is maximum. However, if the size of the light receiving surface of the reference light receiving element 6c is made smaller than each size of the light receiving surface of the first and second detector light receiving elements 6a and 6b, signal levels (Ia, Ic) become relatively high when the current outputs Ia and Ic of the first and second detector light receiving elements 6a and 6b are normalized to obtain current outputs Ia/Ic and Ib/Ic. Thus, excellent signal-to-noise ratio of the normalized current outputs Ia/Ic and Ib/Ic can be obtained, whereby stable normalized current outputs Ia/Ic and Ib/Ic can be obtained. At the same time, the difference between the normalized current outputs Ia/Ic and Ib/Ic of the first and second detector light receiving elements 6a and 6b becomes smaller, thereby obtaining accurate time shared output voltages without consideration of transient response caused when switching of the time shared output voltages.

Furthermore, since each of the first and second detector light receiving elements 6a and 6c have large light receiving surfaces, the light receiving areas of the first and second detector light receiving elements 6a and 6c are larger than the light receiving area of the reference light receiving element 6c even if the orientation of the portable input apparatus 5 is shifted to the periphery of a screen of the CRT 3. Thus, even if the light receiving areas of the first and second detector light receiving elements 6a and 6c are reduced due to the peripheral walls of the openings of the diaphragms thereof in the periphery of the screen of the CRT 3, a return phenomenon of the cursor mark on the screen can be prevented.

Figure 3:
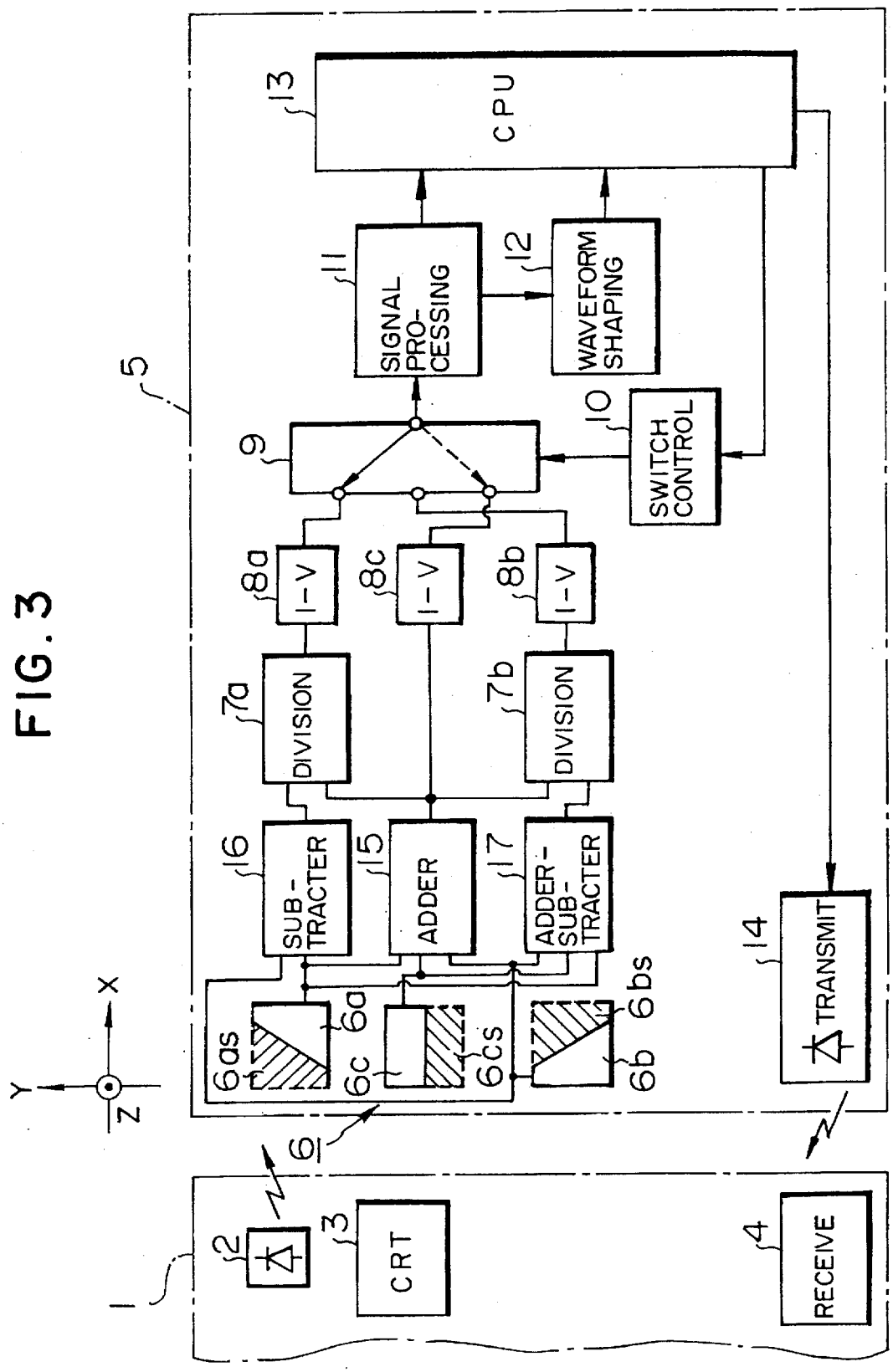
FIG. 3 is a block diagram showing a second embodiment of a portable input apparatus according to the present invention.
Figure 4:
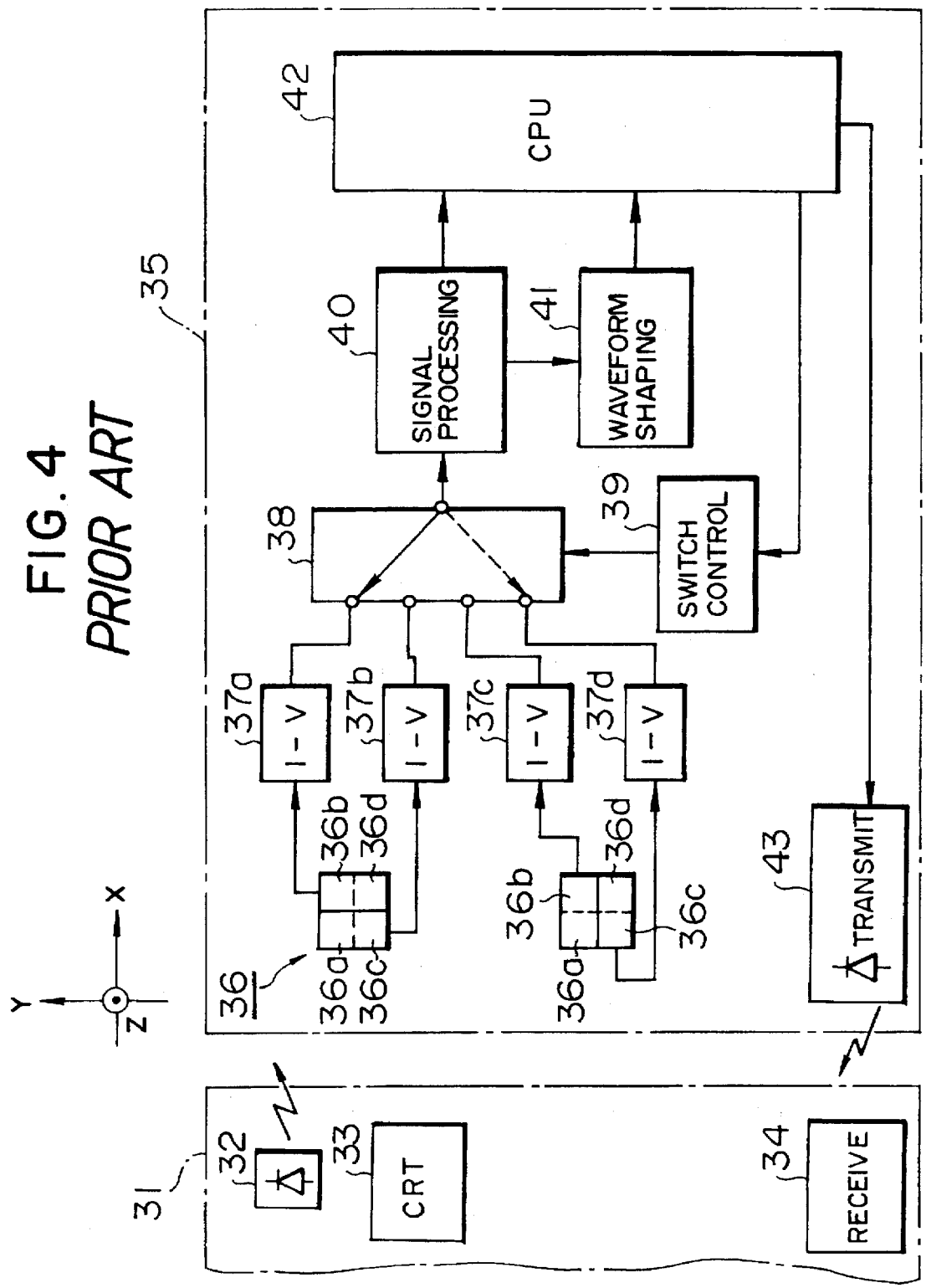
FIG. 4 is a block diagram showing an example of the proposed portable input apparatus.

FIG. 3 is a block diagram showing the second embodiment of the portable input apparatus according to the present invention which includes a relative angle detection apparatus together with a controllable information processing apparatus comprising a computer as in the case of the first embodiment.

As shown in FIG. 3, the shielding member 6as of the first detector light receiving element 6a and the shielding member 6bs of the second detector light receiving element 6b are provided so as to shield substantially lateral half portions of the light receiving surfaces of the first and second detector light receiving elements 6a and 6b in the oblique and different directions to each other. At the same time, a shielding member 6cs of the reference light receiving element 6c is provided so as to shield a substantially longitudinal half portion of the reference light receiving element 6c. The first detector light receiving element 6a, the second detector light receiving element 6b and the reference detector light receiving element 6c are connected to inputs of an adder 15, and the outputs of the adder 15 are connected to the first division circuit 7a, the second division circuit 7b and the third I–V converter 8c, respectively. The first and second detector light receiving elements 6a and 6b are connected to inputs of the division circuit 16, respectively. The first detector light receiving element 6a, the second light receiving element 6b and the reference light receiving element 6c are connected to inputs of an adder-subtracter 17, respectively, and the output of the adder-subtracter 17 is connected to the second I–V converter 8b.

The structure of the portable input apparatus of the second embodiment is different from that of the portable input apparatus of the first embodiment in the following points. The shape of the shielding member 6as of the first detector light receiving element 6a and the shape of the shielding member 6bs of the second detector light receiving element 6b are different from the shapes of the shielding members 6as and 6bs of the first embodiment; the shielding member 6cs is newly provided also on the reference light receiving element 6c of the second embodiment of the portable input apparatus for shielding a substantially lateral half portion of the light receiving surface thereof; and the adder 15, the subtracter 16 and the adder-subtracter 17 are newly provided in the portable input apparatus of the second embodiment. However, since there is no other structural difference between the portable input apparatuses of the first and second embodiments, the description of the extra structure will be omitted.

The portable input apparatus of the second embodiment constructed as described above is operated as follows. In the second embodiment, however, the operation of the portable input apparatus after signal conversion section outputs the time shared output voltages is the same as that in the portable input apparatus of the first embodiment. Therefore, merely the operation before the signal conversion section outputs the time shared output voltages after the base light from the light emitting section 2 of the computer 1 is incident in each of the first detector light receiving element 6a, the second detector light receiving element 6b and the reference light receiving element 6c will be described, and description of the extra operation will be omitted.

First, when the base light is incident in each of the first detector light receiving element 6a, the second detector light receiving element 6b and the reference light receiving element 6c, the current outputs Ia, Ib and Ic are output therefrom. These three current outputs Ia, Ib and Ic are supplied to the adder 15 and the adder-subtracter 17, respectively, and two current outputs Ia and Ib are supplied to the subtracter 16. The adder calculates three current outputs Ia, Ib and Ic and outputs addition current output (Ia+Ib+Ic). The subtracter 16 calculates two current outputs Ia and Ib and outputs subtraction current output (Ia−Ib). The adder-subtracter 17 adds two current outputs Ia and Ib and then, subtracts the current output Ic from the added value (Ia+Ib) to output addition-subtraction current output (Ia+Ib−Ic).

Next, the first division circuit 7a receives and calculates the addition current output (Ia+Ib+Ic) and the subtraction current output (Ia−Ib) to output the first division current output (Ia−Ib)/(Ia+Ib+Ic). The second division circuit 7b receives and calculates the addition current output (Ia+Ib+Ic) and the addition-subtraction current output (Ia+Ib−Ic) to output the second division current output (Ia+Ib−Ic)/(Ia+Ib+Ic). At this time. The first I–V converter 8a receives and performs current-voltage conversion to output a light receiving output voltage V1 of the channel 1. The second I–V converter 8b receives and performs current-voltage conversion to output a light receiving output voltage V2 of the channel 2. The third I–V converter 8c receives the addition current output (Ia+Ib+Ic) and performs current-voltage conversion to output a light receiving output voltage V3 of the channel 3.

The light receiving output voltages V1 to V3 are supplied to the selector switch 9. The movable contacts of the selector switch 9 are switched on a predetermined cycle by the switching controller 10, which operates in response to a channel switching signal supplied from the control section 13, in order of channel 1, channel 2, channel 3, channel 1, channel 2...(first switching mode) or switched in order of channel 1, channel 2, channel 1, channel 2...(second switching mode). In this case, the operation of the selector switch 9 for performing the switching operation either by the first switching mode or by the second switching mode is the same as that of the selector switch 9 in the above-described first embodiment. The light receiving output voltages V1 to V3, or the light receiving output voltages V1 to V2 are selected by the selector switch 9 in a time sharing manner to become time shared output voltages, and the time shared output voltages are supplied to the signal processing section 11.

Various operations performed by the signal processing section 11 and the control section 13 are the same as the operations in the first embodiment. Therefore, the description thereof will be omitted.

In the second embodiment, the first detector light receiving element 6a, the second detector light receiving element 6b and the reference light receiving element 6c, each being of a non-split type are also used as the light receiving element 6 of the portable input apparatus side. Thus, the light receiving element 6a can be manufactured with ease as compared with the split type light receiving element. Further, it is not necessary to use an additional mounting substrate even if the light receiving element 6 is mounted on the main substrate 18 of the portable input apparatus 5 side. Therefore, the cost of manufacturing the light receiving element 6 and peripheral parts thereof can be reduced.

According to the embodiments as described above, the controllable information processing apparatus 1 is a computer. However, the controllable information processing apparatus 1 is not limited thereto, and applicable to a game apparatus and an AV apparatus.

As described above in detail, according to the present invention, the first detector light receiving element 6a, the second detector light receiving element 6b and the reference light receiving element 6c, each being of a non-split type, are used as the light receiving element 6 of the portable input apparatus 5 side. This offers the following advantages. The light receiving element 6 can be manufactured with ease as compared with the split type light receiving element. It is not necessary to use additional mounting substrates when the light receiving element 6 is mounted on the main substrate 18 of the portable input apparatus 5 side, whereby the cost of manufacturing the light receiving element 6 and peripheral devices thereof can be reduced.

In addition, according to the present invention, when a lateral part of the light receiving surface of the first detector light receiving element 6a and a longitudinal part of the light receiving surface of the second detector light receiving element 6b are shielded and when the size of the light receiving surface of the reference light receiving element 6a is made smaller than each size of the light receiving surface of the first and second detector light receiving elements 6a and 6b, the signals become relatively high when the current outputs Ia and Ib of the first and second detector light receiving elements 6a and 6b are normalized to obtain normalized current outputs Ia/Ic and Ib/Ic. Therefore, excellent signal-to-noise ratio of the normalized current outputs Ia/Ic and Ib/Ic can be obtained, thereby obtaining stable normalized current outputs Ia/Ic and Ib/Ic. At the same time, the difference between the normalized current outputs Ia/Ic and Ib/Ic of the first and second detector light receiving elements 6a and 6b becomes smaller. This arrangement offers the following advantages. Accurate time shared output voltages can be obtained without consideration of transient response caused when switching of the time shared output voltages. A return phenomenon of the cursor mark on the periphery of the display screen can be prevented.

What is claimed is:

1. An portable input apparatus which is used in conjunction with a controllable information processing apparatus, the portable input apparatus comprising:
   a light receiving element for receiving a base light emitted from a light emitting section of said controllable information processing apparatus, said light receiving element including:
      a first detector light receiving element having a first light receiving surface which is partially covered by a first shielding member,
      a second detector light receiving element having a second light receiving surface which is partially covered by a second shielding member, and
      a reference light receiving element arranged between the first and second detector light receiving elements, each being of a non-split type;

an optical signal transmitting section for transmitting an optical signal to said controllable information processing apparatus;

a signal conversion section for converting an output current from each of said first, second and reference light receiving elements and for generating an output voltage corresponding to each output current;

a signal processing section for processing said output voltages and for generating relative angle data based on said output voltages; and a control section for performing operation and calculation of said relative angle data to form coordinate data, and for transmitting the coordinate data to said optical signal transmitting section for transmission in said optical signal to said controllable information processing apparatus.

2. A portable input apparatus according to claim 1, wherein said signal conversion section comprised first and second division circuits each dividing outputs currents of said first and second detector light receiving elements by an output current of said reference light receiving element; first and second current-voltage converters each converting output currents of said first and second division circuits into voltages; a third current-voltage converter converting an output current of said reference light receiving element into a voltage; and a switching circuit adding output voltages of said first to third current-voltage converters in a time sharing manner.

3. A portable input apparatus according to claim 2, wherein a lateral part of a light receiving surface of said first detector light receiving element is shielded and a longitudinal part of a light receiving surface of said second detector light receiving element is shielded, and wherein the size of the light receiving surface of said reference light receiving element is smaller than each size of the light receiving surface of said first and second detector light receiving elements.

4. A portable input apparatus according to claim 1, wherein said signal conversion section comprises an adder adding each of output currents of said first detector light receiving element, said second detector light receiving element and said reference light receiving element; a subtracter subtracting an output current of said second detector light receiving element from an output of said first detector light receiving element; and adder-subtracter adding the output current of said first detector light receiving element to the output current of said second detector light receiving element and then, subtracting an output of said reference light receiving element; first to third current-voltage converters each converting output currents of said adder, subtracter and adder-subtracter into voltages; and a switching circuit adding output voltages of said first to third current-voltage converters in a time sharing manner.

5. A portable input apparatus according to claim 4, wherein each of lateral parts of the light receiving surfaces of said first detector light receiving element and said second detector light receiving element are shielded in the oblique and different directions to each other, and wherein a longitudinal part of the light receiving surface of said reference light receiving element is shielded.

6. An input apparatus, comprising:

a light emitting section for emitting a base light;

a light receiving element for receiving said base light, said light receiving element including:

a first light detector having a first light receiving surface which is partially shielded by a first shielding member, wherein said first light detector generates an output signal corresponding to an amount of said base light received by said first light receiving surface, a second light detector having a second light receiving surface which is partially shielded by a second shielding member, wherein said second light detector generates an output signal corresponding to an amount of said base light received by said second light receiving surface, and a third light detector having a third light receiving surface, wherein said third light detector outputs a reference signal corresponding to an amount of said base light received by said third light receiving surface; and a control section for calculating a relative positional relationship between said light emitting section and said light receiving element based on said reference value and said output values from said first and second light detectors.

7. An input apparatus according to claim 6, further comprising means for generating a first detected value based on a ratio of said output signal generated by said first light detector to said reference signal, and means for generating a second detected value based on a ratio of said output signal generated by said second light detector and said reference signal;

wherein said control section calculates the relative positional relationship in response to said first and second detected values.

8. An input apparatus, comprising:

a light emitting section for emitting a base light;

a light receiving element for receiving said base light, said light receiving element including:

a first light detector having a first light receiving surface which includes an elongated exposed portion aligned in a first direction, wherein said first light detector generates an output signal corresponding to an amount of said base light received by said elongated exposed portion of said first light receiving surface, a second light detector having a second light receiving surface which includes an elongated exposed portion aligned in a second direction which is different from the first direction, wherein said second light detector generates an output signal corresponding to an amount of said base light received by said elongated exposed portion of said second light receiving surface, and a third light detector having a third light receiving surface, wherein said third light detector outputs a reference signal corresponding to an amount of said base light received by said third light receiving surface; and a control section for calculating a relative positional relationship between said light emitting section and said light receiving element based on said reference value and said output values from said first and second light detectors.

9. An input apparatus according to claim 8, further comprising means for generating a first detected value based on a ratio of said output signal generated by said first light detector to said reference signal, and means for generating a second detected value based on a ratio of said output signal generated by said second light detector and said reference signal;

wherein said control section calculates the relative positional relationship in response to said first and second detected values.

* * * * *

UNITED STATES PATENT AND TRADEMARK OFFICE
CERTIFICATE OF CORRECTION

PATENT NO. : 5,701,187
DATED : December 23, 1997
INVENTOR(S) : Masatoshi Uchio et al.

It is certified that error appears in the above-indentified patent and that said Letters Patent is hereby corrected as shown below:

In claim 2, line 2, replace "comprised" with -- comprises --.

Signed and Sealed this

Fifth Day of January, 1999

Attest:

Attesting Officer

Acting Commissioner of Patents and Trademarks